(12) United States Patent
Scott et al.

(10) Patent No.: US 6,229,112 B1
(45) Date of Patent: May 8, 2001

(54) AIR HANDLING SYSTEM FOR A LASER-EQUIPPED MACHINE TOOL

(75) Inventors: William B. Scott, Rochelle; James W. Orr, Jr., Byron; Ira E. Cole, III, Rockford, all of IL (US)

(73) Assignee: W. A. Whitney Co., Rockford, IL (US)

( * ) Notice: Subject to any disclaimer, the term of this patent is extended or adjusted under 35 U.S.C. 154(b) by 0 days.

(21) Appl. No.: 09/302,602

(22) Filed: Apr. 30, 1999

(51) Int. Cl.[7] .............................. B23K 26/16; B23K 26/14
(52) U.S. Cl. ........................... 219/121.67; 219/121.68; 219/121.7
(58) Field of Search .................... 219/121.67, 121.86, 219/121.7, 121.84, 121.68, 121.69, 121.63, 121.66, 121.64, 121.65, 121.6

(56) References Cited

U.S. PATENT DOCUMENTS

| | | | |
|---|---|---|---|
| 3,866,398 | * | 2/1975 | Vernon, Jr. et al. . |
| 3,991,296 | * | 11/1976 | Kojima et al. . |
| 4,063,059 | * | 12/1977 | Brolund et al. . |
| 5,053,600 | * | 10/1991 | Chun et al. . |
| 5,763,852 | * | 6/1998 | Brolund et al. . |

FOREIGN PATENT DOCUMENTS

| | | | |
|---|---|---|---|
| 2015895 | * | 1/1990 | (JP) . |
| 6063785 | * | 3/1994 | (JP) . |
| 6063786 | * | 3/1994 | (JP) . |

* cited by examiner

*Primary Examiner*—Tom Dunn
*Assistant Examiner*—Jonathan Johnson
(74) *Attorney, Agent, or Firm*—Leydig, Voit & Mayer, Ltd.

(57) ABSTRACT

An air handling system for a laser-equipped machine tool. The machine base is specially configured to include and form part of the duct work which extracts fumes produced during the cutting operation. An elongated collection duct is provided in portions of the machine base bracketing a slag collection surface, and the port pattern in the collection ducts is graduated so as to achieve relatively even flow across the entire machine. The collection duct communicates with a main duct in the machine base which has outlet connections at three sides of the base, affording flexibility in selecting a particular outlet for connection to an external vacuum source. Cooperating with the air extraction components, the machine is enclosed and air vents are provided at strategic locations in the enclosure to control both the volume and direction of air into the enclosure to provide for efficient extraction of fumes produced as a by-product of the cutting operation.

21 Claims, 9 Drawing Sheets

AIR HANDLING SYSTEM FOR A LASER-EQUIPPED MACHINE TOOL

FIELD OF THE INVENTION

The present invention generally relates to machine tools, and more particularly relates to machine tools using lasers for cutting metal and other materials.

BACKGROUND OF THE INVENTION

Laser-equipped machine tools are often used to cut parts from sheet metal and relatively thin plate. In such machine tools a laser beam, concentrated by a focusing lens or mirror to a small diameter spot, is directed to position the focal point above, on or below the surface of the material to be cut. The laser beam is directed from the focusing optic through a nozzle disposed immediately above the material workpiece with a pressurized gas being directed through the nozzle, typically coaxially with the laser beam, to assist making the cut. The pressurized gas interacts with the laser beam and material facilitating the cutting process, and creates a gas stream which carries the removed material away from the cut. The removed material consists of fumes, various size particles and drops of molten material some of which are small enough to remain airborne for some time. The amount of fumes created during metal cutting is usually small. More fumes are generated cutting non-metallic materials. Depending upon concentration of fumes in breathed air and the type of material cut, fumes can be a health hazard. Some fumes are poisonous.

Laser-equipped machine tools are Computer Numerically Controlled and are manufactured in many configurations and sizes and with lasers of various types and power. In one configuration, "flying optics", the cutting head is adapted for movement along one axis, such as the Y-axis which is mounted on a bridge adapted for movement in an orthogonal, X-axis. The work is supported on a stationary pallet or table below the bridge. Movement of the cutting head is coordinated with movement of the bridge to define a precise path on the part. The cutting head and laser are controlled to pierce and cut the metal to form holes and shapes in the material, and then to cut the part from the material. In this configuration the laser is mounted on the stationary machine base or on a separate floor mounted stand.

Many same or different parts of common thickness and material type may be cut from a sheet or plate. Such groups of parts are commonly referred to as a nest. Left over material, after the parts have been removed, is referred to as a remnant or a skeleton. A small remnant which falls from a hole cut in a part is called a slug. Remains of material from the cut is called slag. Resolidified material clinging to the part is called dross. The mixture of slugs and slag residue from cutting sheet material is generally called scrap.

When using laser-equipped cutting machine tools it is advantageous to utilize optics with different focal lengths to cut various thicknesses of material. The focal length of the optic contributes to the diameter of the focal spot and thus the energy density, Watts per unit area, at the focal spot. Shorter focal length optics create smaller focal spots having higher energy densities. The focal length of the optic also contributes to depth of focus of the focal spot with longer focal lengths having greater depth of focus. Shorter focal length optics are advantageous for cutting thinner materials while longer focal length optics are advantageous for cutting thicker material.

Various means for dealing with fumes have been utilized and in some cases the problem is ignored. Laser equipped machine tools are available which have no provisions for removing fumes generated by the cutting process. Usually these machines are utilized to cut low carbon steel. In these cases it is assumed that plant ventilation is adequate to prevent fume concentrations reaching hazardous levels.

Providing for efficient fume collection is not a simple problem. The material to be cut is supported on a worktable or pallet which has been sized for the maximum size part to be cut and designed to provide as much open area through the table as possible while providing adequate support for the workpiece and parts cut from it. Normally, a border remains around the workpiece on the worktable or pallet. This border provides space for work locators, clamps and sheet tolerances. Often the workpiece cut is smaller than the maximum size the table is designed to handle. As a result there is a lot of variation in the space around the workpiece through which fumes can escape. Also cutting the workpiece creates holes and open spaces through which fumes can escape. These conditions make it difficult to provide an efficient and reasonably sized and priced blower and filter system.

In some machines the cutting area has been enclosed from the sides by the design of the machine creating a trough. A large duct and blower is placed at the end of the trough creating an air flow under the part to collect the fumes. Because of factors described earlier, these systems are not very efficient fume collectors.

In other cases multiple ducts have been provided under the cutting area providing multiple fume collection points. Efficiency depends upon the number of collection points and the distance between the collection points and where the cut is made.

In other cases the cutting area, under the work support, is partitioned into several zones by sheetmetal and duct work, the duct work provided with valves which open the zone in which cutting is taking place. The other zones are left closed. This reduces the size of the collection area and allows use of a smaller blower and dust collector.

As lasers, with beam qualities suitable for cutting, are developed and become available in higher powered versions, machines are developed having the ability to cut greater thicknesses of material. Adapting high power lasers to cut thicker materials leads to using focusing lenses with longer focal lengths. Below the focal point, a laser beam expands at approximately the same rate that it was focused. For example, if a 35 mm diameter laser beam is focused by a lens with a 10" focal length, then, 10" below the focal point, unless absorbed by the material cut, the beam would be about 35 mm diameter again. Twenty inches below the focal point the beam would be about 70 mm diameter. This remnant, expanding beam from high power lasers has considerable capability to cause damage. For example, in an experiment a 0.125" thick aluminum plate was scuffed with steel slag, then a 38 mm diameter 5500 Watt beam was directed at the surface. The aluminum was cut through in 40 seconds. Similar tests were done with 0.25" thick stainless steel and carbon steel. Both were cut through in well under a minute. These tests indicated that a dust collection system, underlying the cutting area of a high power laser system, with long focal length optics in use, would be at considerable risk of being damaged by the remnant laser beam.

It would be advantageous to provide a dust collection system for a high power laser-equipped machine tool which can remove fumes produced by the cutting process and which is not at risk of being damaged by the high power laser beam.

SUMMARY OF THE INVENTION

In view of the foregoing, it is a general aim of the present invention to provide an air handling system for a laser-equipped machine tool which is built directly into the machine base, and which cooperates with a machine enclosure to provide controlled air flow through the cutting zone to effectively and efficiently withdraw the fumes resulting from the laser cut.

In that regard, it is an object of the present invention to utilize the machine base structure itself as an element of the air handling system. An even more detailed object, in that regard, is to configure the machine base to provide a plurality of connection points for a dust collector and extractor, to allow the user to select a particular one of those connection points to suit a particular installation.

It is also an object of the invention to provide an air handling system which is not at risk of damage by a high power laser beam.

It is another object of the invention to provide an air handling system which avoids the complexity of shutting off ducts in zones of the system when cutting is being done in another zone, yet provides for effective withdrawal of the gases and dust without dependence on the position in the system where the cutting is taking place.

It is another objective of the present invention to provide an air handling system with an improved ability to draw gases and fumes from the entire cutting area below the worktable of the machine tool.

It is another objective of the invention to control air flow into and through the enclosure such that dead spaces where fumes could accumulate are eliminated.

A specific object of the present invention is to build the main collection duct into the machine base such that it requires no additional room, has no duct work exposed to the laser beam, does not extend the internal size of the machine, and concurrently provides for multiple connection points selectable to the user.

It is a feature of the present invention that the machine base is provided with a welded box structure, with the box structure altered to provide a duct internal to the base which can be accessed at several locations around the machine, any one of which can provide a connection point for a vacuum source or dust collector. These comparatively larger main ducts, serving as exit ducts, are built directly into the machine base and are interconnected with smaller collection ducts, also built into the machine base, but in an area above the slag collection surface. Ports into the collection duct are sized with respect to their distance from the junction with the main duct, so as to render the air flow into the air handling system comparatively uniform, or to allow tailoring of the air flow to the particular needs of a particular installation. The elements of the air handling system are positioned outside of the cutting zone, except for the main duct which is protected from laser damage by the slag collection plate.

As a further feature of the invention, the entire cutting machine is enclosed by a cover which can be opened and manipulated for ready access to the machine, but which can be closed during cutting. When the enclosure is closed, air flows through intended inlets, which are positioned in cooperation with the collection ducts in order to provide controlled air flow through the cutting zone adapted to maximize extraction of fumes.

Other objects and advantages of the invention will become more apparent from the following detailed description when taken in conjunction with the accompanying drawings.

BRIEF DESCRIPTION OF THE DRAWINGS

FIG. 9 is a partial sectional view of the area denoted by oval 9 in FIG. 6, showing the preferred form of connection between an inlet port aperture plate and the collection duct.

Figure 1:
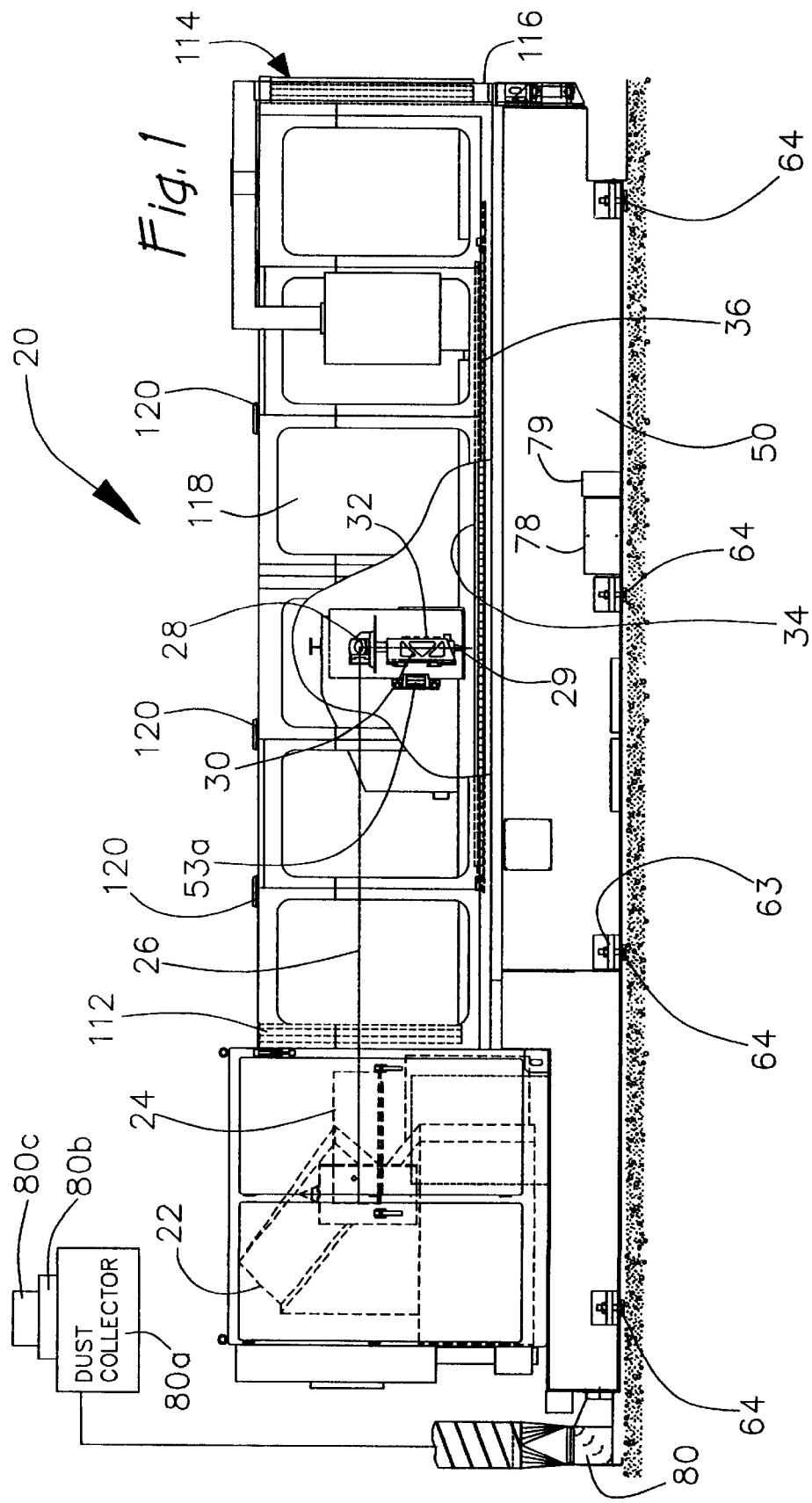
FIG. 1 is a front elevation of a laser-equipped machine tool having a base structure incorporating an air handling system exemplifying the present invention.

While the invention is susceptible of various modifications and alternative constructions, and certain illustrative embodiments thereof have been shown in the drawings which will be described below in detail, it should be understood that there is no intention to limit the invention to the specific forms disclosed. On the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to the drawings, and with specific reference to FIG. 1, a preferred embodiment of the present invention is generally depicted as embodied in machine tool 20. By way of background machine tool 20 includes a laser source 22 which delivers a high power laser beam to a collimator 24, which in turn directs a collimated laser beam 26 to first bending mirror 27 (see FIG. 2). The laser beam 26 is then directed to a second bending mirror 28 and then to cutting head 30 which includes a focusing optic 32 (See FIG. 1) which focuses the laser beam onto workpiece 34. The laser beam 26 is projected through a nozzle 29 at the base of the cutting head along with a flow of assist gas, such as nitrogen or oxygen. The laser beam and assist gas interact with each other and with the metal to cut through the workpiece 34. While an important use of laser cutting machines is the cutting of metal, it will be noted that other materials can be cut, and the invention is not limited to lasers for cutting metal.

Workpiece 34 in the preferred embodiment, is mounted on table or pallet 36 which is constructed for minimum interference with the laser beam, and to allow slag and scrap to readily fall through the table. The table or pallet 36 is preferably made up of a plurality of bars spanning the width of the table, and turned on edge so that their narrow cross-section is presented to the laser. The upper edge of each bar is serrated in large tooth-like fashion to support the workpiece at a plurality of points in bed-of-nails fashion. Such worktables are known in the laser cutting art, and will not be further described, except to note the feature that the scrap material generated during the cut will readily fall through the worktable.

The machine base 50 supports the operative elements discussed thus far, including the table 36 and the cutting head 30, along with additional elements such as the slag collection bed, and a slag removal system. The machine base, as will be described in greater detail below, also provides the main duct work for the air handling system. Those familiar with machine tools will appreciate that the base must be strong, rigid and stable in order for a high performance machine as illustrated to perform within its close machining tolerance capabilities.

In providing for a strong and rigid base, the present invention uses a welded structure comprising interlocked box structures, joined by a plurality of rigid cross-members. FIG. 5 shows the base in plan view and FIG. 4 in elevation. As shown in end elevation in FIG. 3 the base is of U-shaped configuration, with a trough 51 underlying the worktable and cutting area, interposed between a pair of upstanding legs 53 at either side, which provide support, for example, for the ways 53a on which the bridge carrying the cutting head rides.

Thus, referring again to FIGS. 4 and 5, vertical plates 52 run in the lateral direction and are L-shaped with the foot 52a of the L underlying the trough 51, and the ascender 52b of the L underlying the legs. These parts may, for convenience be referred to herein as the short lateral plates 52a and the taller lateral plates 52b. Running longitudinally of the machine and intersecting the lateral plates 52 are longitudinal plates. Short longitudinal plates 57 are about the same height as the short lateral plates 52a and attached to those plates, to form a supporting structure within the trough 53. Taller longitudinally directed plates 58 are about the same height as the longer lateral plates 52b and define the sides of the legs 53.

Figure 4:
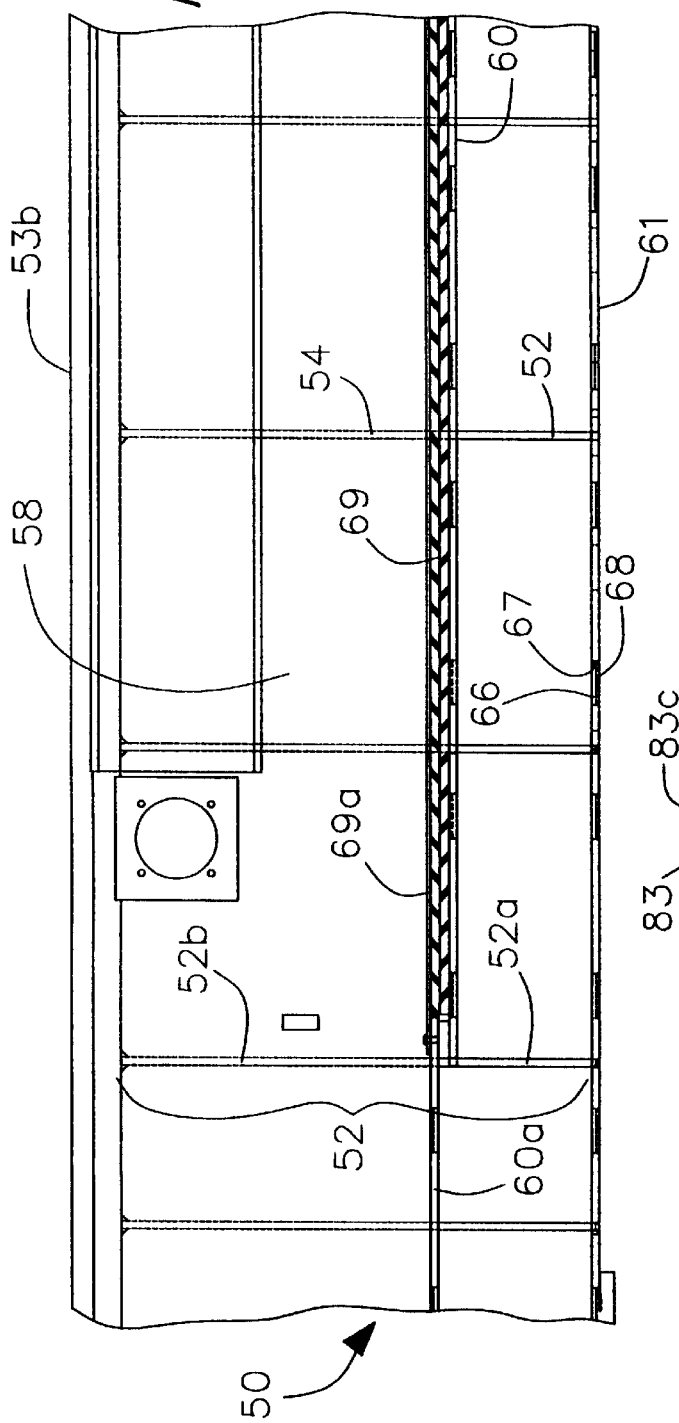
FIG. 4 is a sectional view taken along the line 4—4 of FIG. 2, and better illustrating the machine base structure.
Figure 5:
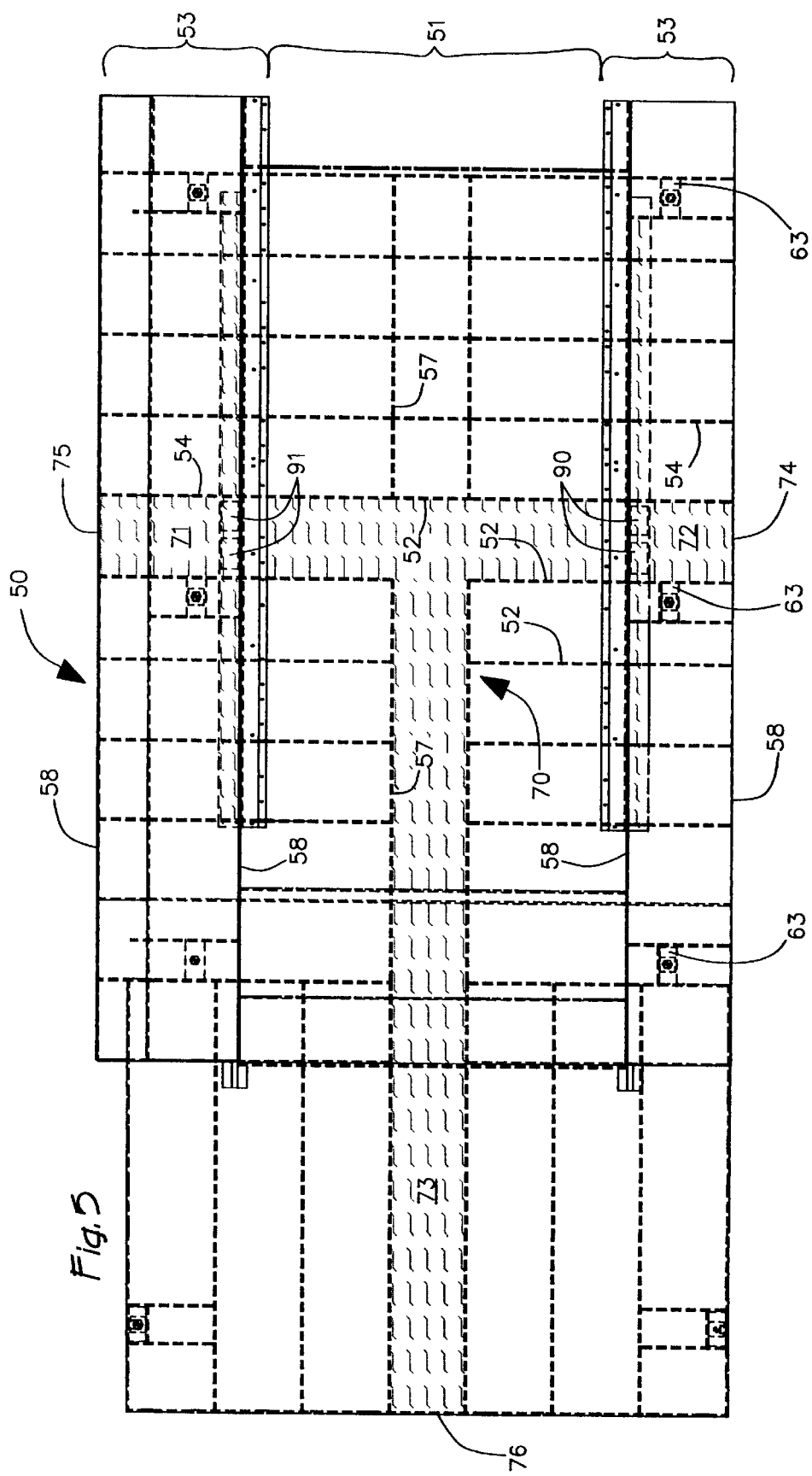
FIG. 5 is a simplified plan view showing the machine base and the air handling ducts of the machine tool of FIG. 1.

FIG. 4 shows the structure in elevation, and also shows top and bottom members for the box structure. More particularly, a top is formed by a longitudinally extending horizontal plate 60, which establishes the level of the slag collection trough. The plate 60 establishes a cavity for receiving sheets of insulation 69, preferably gypsum board, which in turn are covered by a slag collection plate 69a, preferably comprised of a plurality of individual side-by-side sections spanning the bed from left to right, and affixed to the base and supported by the insulation 69. A bottom plate 61 is attached to the foot of each of the upstanding plates. The legs 53 are closed at their tops by plate 53b. Mounting pads 63 are rigidly affixed to the bottoms of certain of the box structure plates, as illustrated in FIG. 5, in order to provide a supporting structure for leveling feet 64 (FIG. 1) which engage the pads 63 and are adjusted for leveling of the machine. The base structure is a welded tab and slot construction. Thus, the vertical longitudinal plates 57, 58, the vertical lateral plates 52, 54 and the horizontal plates 60, 61 have appropriate tabs 66 and slots 67 welded, for example at 68 (see FIG. 4 for an exemplary tab/slot/weld location) to provide the rigidified box structure. This strength and rigidity is provided without the weight penalty of a cast base.

Figure 2:
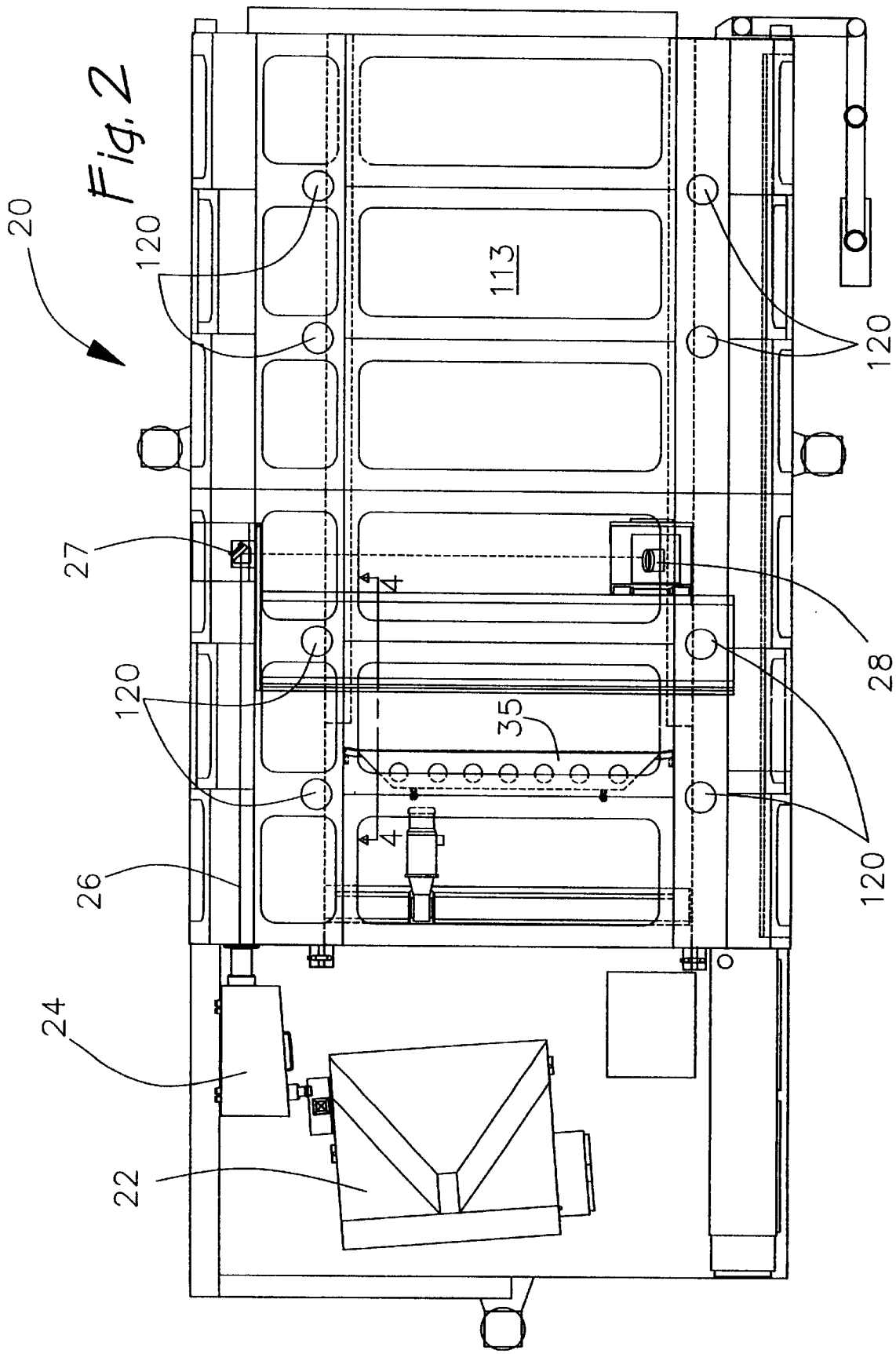
FIG. 2 is a plan view of the machine tool of FIG. 1.

In practicing the invention, the base structure just described is specially configured to provide the duct arrangement for the air handling system which removes fumes (sometimes referred to herein as contaminated air) from the cutting zone. Referring again to FIG. 5, it will be seen that the box structure of the machine base is arranged to provide a main duct 70 formed directly by the welded plates which make up the base. The main duct 70 is highlighted in FIG. 5 by symbols intended to represent fumes. The duct 70 connects collection ducts, to be described below, to a vacuum source or extraction system (not shown in FIG. 5). The duct 70 is T-shaped in configuration with arm sections 71, 72 and a stem section 73. In cross-section the duct is a four-sided rectangular tube, with the bottom plate 61 (FIG. 4) making up the bottom of the duct, the top plate 60, making up the top of the duct and vertical plates 52, 54 or 57 making up the duct sides. The box structure of the base is designed with selected boxes open in end-to-end fashion to create a continuous duct through the machine base. Thus there is no need for additional duct work within the machine, the passages for connection to the exhaust equipment are directly built into the base. The T-shaped configuration provides three connection points 74, 75 and 76 for air and dust extraction equipment. Other locations could be provided, if desired. It would not be useful, however, to provide one at the right hand end of the machine (as seen in FIG. 5) because that end is facing the loading station and must be kept clear for machine operator access, for bringing new work into the machine, old work out of the machine and for clearing slag and scrap. A cover for one of the duct sections, 74 is illustrated in FIG. 1, comprising a gasketed plate 78 which can be affixed in place over the unused duct outlets. Cover 79 encloses electrical connection points which are provided at each duct location for connection of dust collector blower electricals. Electrical conduits internal to the base for dust collector electricals are not shown. FIG. 1 shows a duct fitting 80 connected to the end duct 76 leading to remotely positioned dust collector 80a equipped with blower 80b and blower motor 80c. These remotely positioned elements are sometimes referred to herein as the vacuum source. Electrical connections would be made through the corresponding electrical outlet. In the FIG. 1 configuration, covers would be in place over the duct work at outlets 74 and 75. However, the three outlets are provided so that when the laser-equipped machine tool is installed in a particular plant, the user can select the location most convenient for that particular installation. It is also noted that FIG. 2 shows duct fittings connected at all three locations 74, 75 and 76, simply to show all possibilities. It would not be necessary to use more than one for any given installation.

Figure 3:
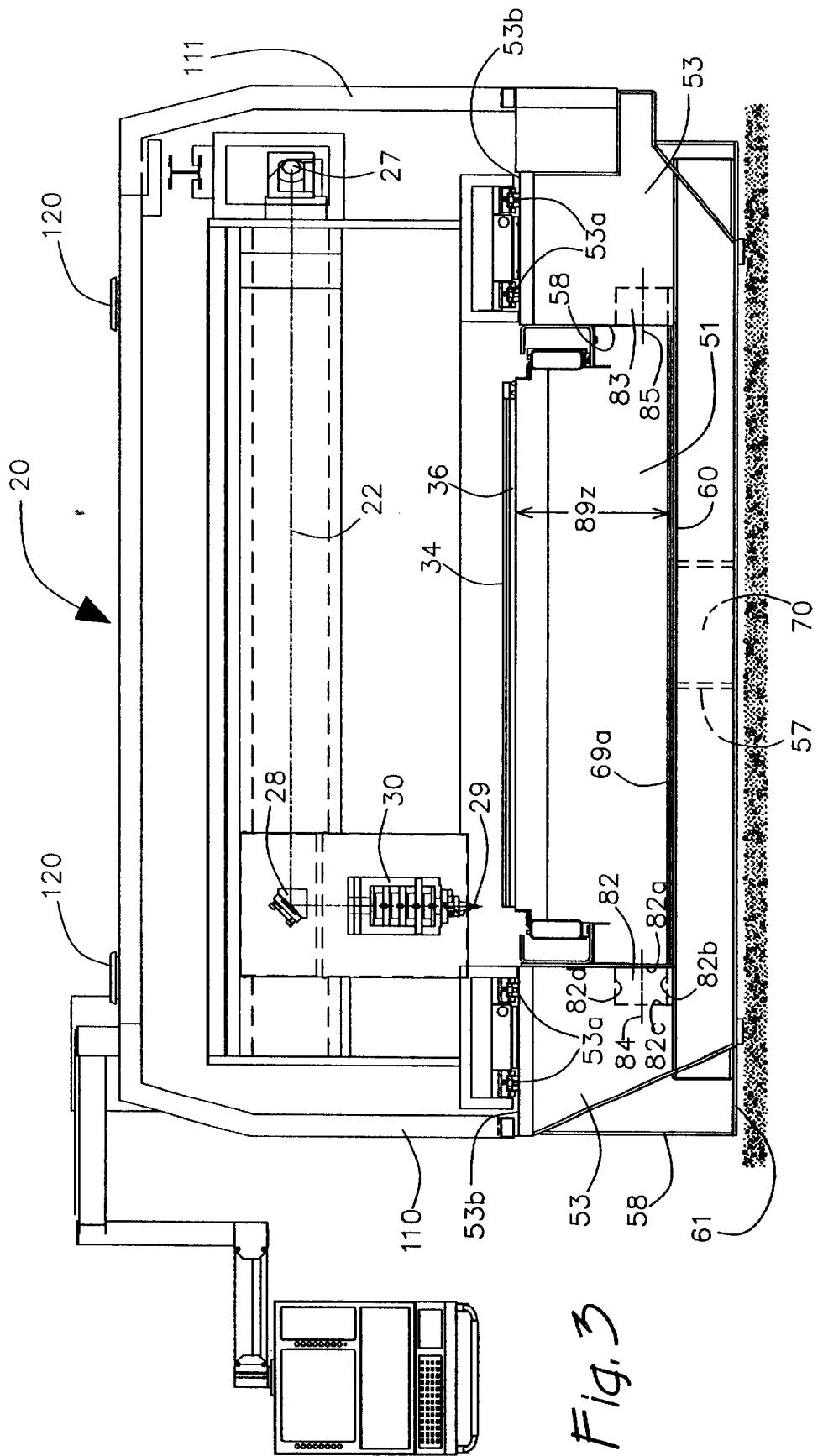
FIG. 3 is an end elevation sectional view of the machine tool of FIG. 1.
Figure 6:
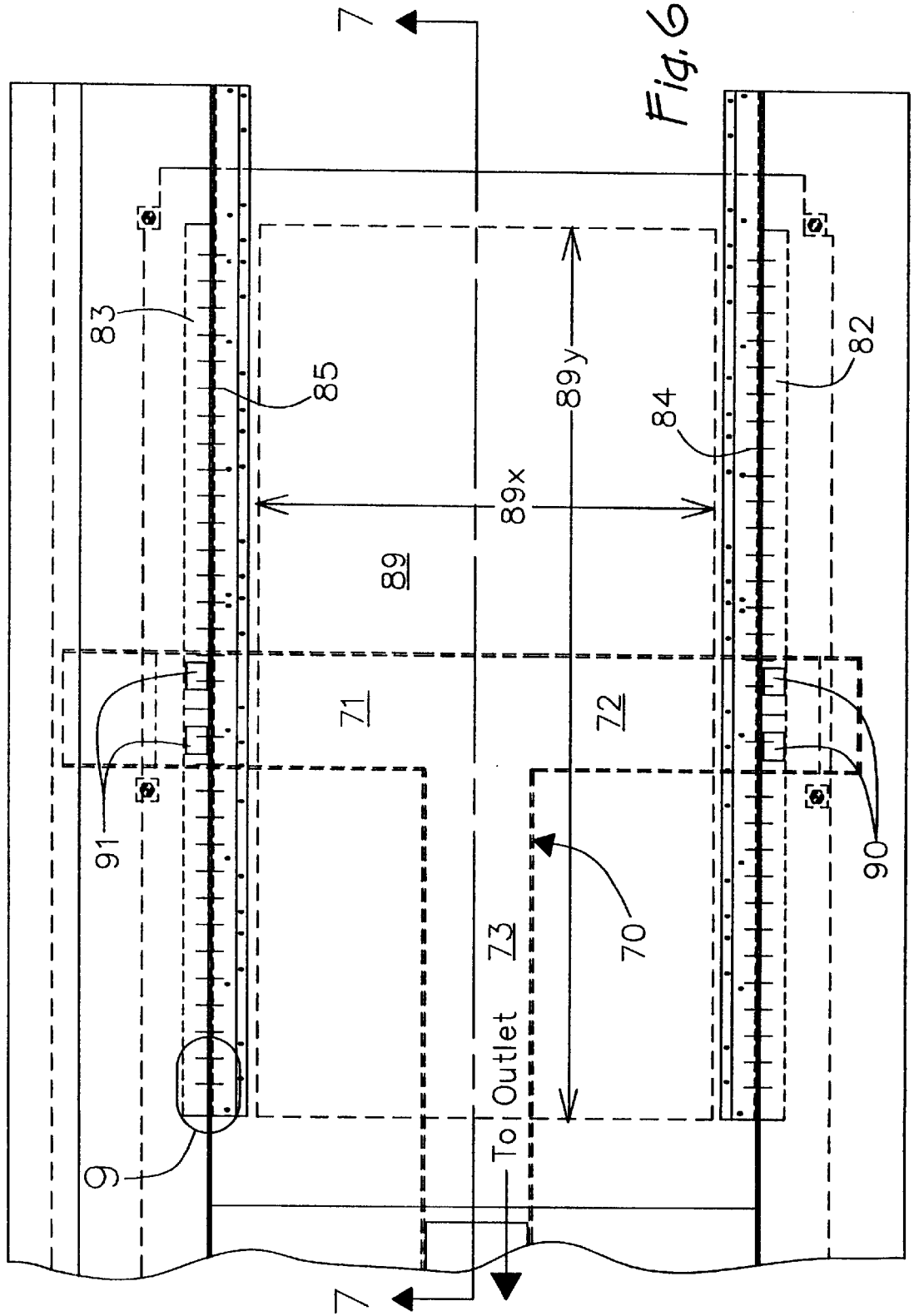
FIG. 6 is a simplified schematic plan view of the machine base emphasizing the collection ducts and main duct of the air handling system.

Referring to FIGS. 3 and 5, it will be seen that in addition to the main duct 70 built into the lower base section, the leg sections 53 also house a portion of the duct work. In this case collection ducts 82, 83 are built into the respective legs and have a plurality of apertures denoted by center lines 84, 85 which serve to connect the collection duct with the trough area 51 of the machine tool from which the fumes are to be collected. It will be appreciated that the fumes will be generated at and below the cutting nozzle 21 as the cutting head 30 traverses the workpiece from side to side and front to back. Most of the dust and gases will be concentrated below the workpiece, in the volume referred to as cutting zone 89 (FIG. 6). The horizontal plane of the cutting zone is best seen in FIG. 6, where $89_Y$ identifies the approximate extent of the plane along the Y-axis, and $89_X$ the approximate extent of the zone in the X-axis direction. FIG. 3 shows the third coordinate $89_Z$ as existing between the slag collection base 75 and approximately the workpiece 34. The volume 89 approximately identified by the three coordinates, is the area in which the highest concentration of fumes is expected to exist, and which must be removed during cutting. Some fumes, will rise above the workpiece, and the air flow paths to be described below will tend to carry them to the duct system.

FIG. 6 also illustrates the multiple levels of the air handling system according to the invention. The T-shaped duct 70 in the lower base is illustrated in double dash lines, and the collection ducts 82, 83 are illustrated in dashed lines. The center lines 84, 85 are shown spaced across the length of the collection ducts 82, 83. Each center line represents a port through which air will be withdrawn from the cutting zone 89, and it will be seen that they are spaced along the entire length of the cutting zone, on both sides thereof.

Referring in greater detail to the duct 82 in FIG. 3, it will be seen that the wall 82a in which the ports are formed is one of the upstanding walls of the frame structure. The remaining walls 82b, 82c, 82d represent three sides of a fabricated duct welded or fixed in place. As shown in FIG. 6 the duct extends along the entire length of the cutting zone 89 but is positioned just outside the cutting zone in an area protected from the laser. In the region where the ducts 82 and 83 cross the main duct legs 72, 73, the collection ducts are apertured as shown at 90, 91 so that the material drawn into the collection duct is then passed to the main duct 70 and to the exhaust and dust collection system. This system will be equally effective whether the exhaust system is connected to any of the selected ports 74, 75 or 76, since the vacuum drawn by the extraction system, wherever connected, will be communicated through the openings 90, 91 into the collection ducts 82, 83 and thereby draw air through each of the ports connected to the collection duct.

In practicing one aspect of the invention, the ports through which the contaminated air is drawn into the collection ducts 82, 83 are configured to balance the flow across the entire length of the cutting zone. Alternatively, if a particular installation tends to do more or heavier cutting on one end of the machine than on the other, the machine could be configured to increase the air flows in that zone.

Figure 7:
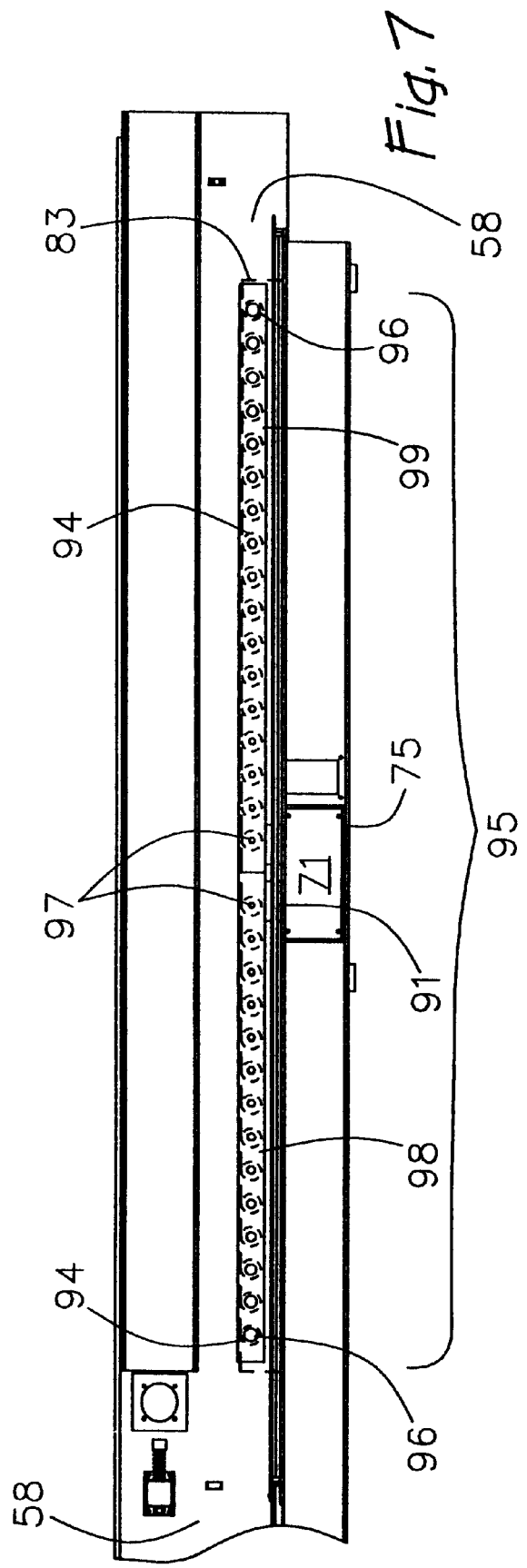
FIG. 7 is a sectional view taken along the line 7—7 of FIG. 6.
Figure 8:
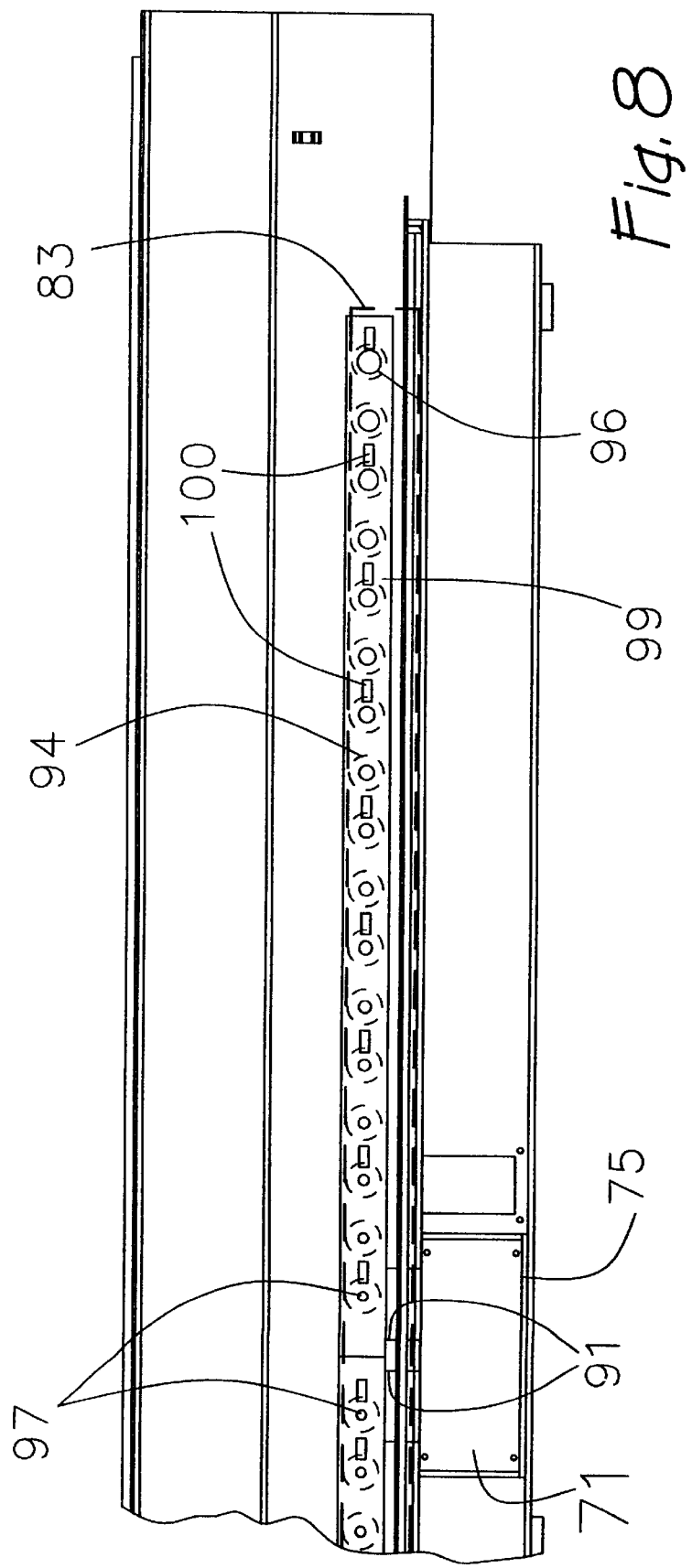
FIG. 8 is a partial view, like FIG. 7 but enlarged to better show the graduated ports.

The manner in which that is accomplished is best illustrated in FIGS. 7 and 8 which show a longitudinal array of ports 95 of varying diameter and cross-sectional area configured to achieve substantially constant flow of air across the entire length of the machine. Apertures 91 show the connection of the duct section 71 with the collection duct 83. It is seen that each port in the array of ports 95 is made up of two concentric apertures. In the preferred practice of the invention, the wall 58 which comprises a vertical member of the side wall has a plurality of apertures 94 formed therein, preferably all of the same size, and preferably larger than the largest port. The ports are then sized by means of removable port plates, two of which are shown in FIG. 7 at 98, and 99. Each of the port plates has a pattern of holes formed therein to fit over the larger apertures 94 to define a smaller port by means of its smaller aperture size. The apertures in the plates 98 & 99 are configured so that the apertures nearest the main duct entrance, i.e. apertures 97 have the smallest diameter, and the apertures at the greatest distance therefrom, i.e. apertures 96 have the largest diameter. The vacuum pressure within duct 83 will vary due to the distance from connection 91 and due to increasing volume of air flow along the length of duct 83, with the minimum volume flow near the ends and the maximum volume flow at the center. The larger port size at increasing distance from the main duct maintains a substantially equal flow from port to port across the length of the duct, thereby to achieve substantially constant withdrawal flow across the length of the cutting zone. As noted above, however, if something other than an even withdrawal flow were required, it would be a simple matter to configure the ports with an array of port sizes needed to achieve that end. For the configuration requiring even flow across the machine, one example of the machine has been configured with the nearest ports 97 being approximately 20 mm in diameter whereas the farthest ports 96 have a diameter of about 50 mm, and intermediate ports are graduated in size therebetween.

FIGS. 8 and 9 illustrate the manner in which a ported plate is fitted to the side wall of the machine to tailor the port size to that desired for a particular installation. FIG. 9 shows the upstanding base member 58 and the duct 83 formed by sides 83a–83d. The larger apertures 94 formed in the wall 58, preferably of equal size, are illustrated, as well as a port plate 98 having smaller port sizes 96, 96a, to restrict the size of the opening through which air is drawn. The plate 98 is fixed in place with the ports overlying the apertures 94. Conveniently a plurality of clips 100 (only one is shown in FIG. 9) is utilized which allow the plate 98 to be roughly positioned with the clips 100 inside associated apertures 96, then slid to the right until the clips seat as shown in FIG. 9, automatically aligning all of the ports with all of the apertures. Other means of affixation can be utilized, but suffer from the complexities of requiring threaded openings or other fasteners. The simple solution provided by the clipped in place adjustable ports will now be apparent.

In further practice of the invention, cooperating with the duct and port arrangement described thus far, means are also associated with the machine tool for controlling the entrance of air into the machine, so as to render controllable the collection and exhaust of contaminated air and to provide a more effective and efficient system. In accordance with the invention, means are provided for both controlling the amount of air which enters the machine and also the direction from which it enters, so as to maximize flow of fumes to the exhaust and filter system. From an examination of FIGS. 1, 2 and 10, it will be apparent that the entire cutting zone of the machine is enclosed. Upstanding walls 110, 111 close the front and back sides of the machine. Upstanding walls 112 with access doors close the end near laser 22. A roof 113 encloses the top. Upstanding walls 114 with an access door enclose the end near the load station. The trough 51 (FIG. 3) area near the load station is also closed by a metallic gate 115 (FIG. 10) except for a rectangular opening 116 providing for entrance and removal of the work support pallet. For convenience of operation, doors 118 which make up the walls 110, 111 can be arranged on sliding tracks in bypass fashion so that some or all of the doors can be opened for access to the machine, such as during maintenance. However, during the cutting operation, it is expected that all of the doors will be closed. A flow of make up air into the enclosure is necessary to replace that removed to remove fumes. The primary path for make up air is through pallet passageway opening 116. The opening is at the level of the pallet, and therefore the flow will be directly to the pallet. Due to the suction created in the cutting zone below the workpiece, the primary flow will be beneath the workpiece, where the gases, dust and fumes are projected during the cut. The opening spans the width of the workpiece, but is limited in height, so that the curtain of air, which is the primary volume of makeup air into the system, flows right into the cutting zone and through the graduated ports into the collection duct of the exhaust system, carrying with it the fumes created during the cut.

Formed in the roof 113 are a plurality of air inlets 120 which allow air flow into the cutting area from the top of the enclosure. The air inlets 120 are located at about the periphery of the cutting zone 89, so that the air flow will be through the vents, downwardly onto or past the workpiece and to the collection ducts 82, 83. The vents 120 provide for a continuous but limited amount of air flow through the air space at the top of the enclosure above the workpiece, and into the cutting zone for exhaust. Providing these air flow paths in the upper part of the housing avoids the creation of air pockets in the housing which might otherwise collect fumes. The provision of vents spaced along the roof with some air stirring obtained when the bridge traverses back and forth prevents the collection of pockets of fumes in the upper portion of the housing, while the main flow through the large inlet vent 116 supplies the primary flow through the collection zone for pickup of contaminants created during the cut. It will be noted that when "vents" is used herein, unless the context indicates otherwise, its is intended to be generic to include all inlets of controlled size, in the illustrated embodiment primarily the inlets 120 and the opening 116.

Positioning the air inlets 120 where shown, and the air flow through pallet passageway 116 at the loading end of the machine creates a very even air flow through the system capable of efficiently withdrawing fumes from the cutting operation. The air inlets 120 are provided with air flow paths such that there is no direct escape path for reflected laser beam energy.

Figure 10:
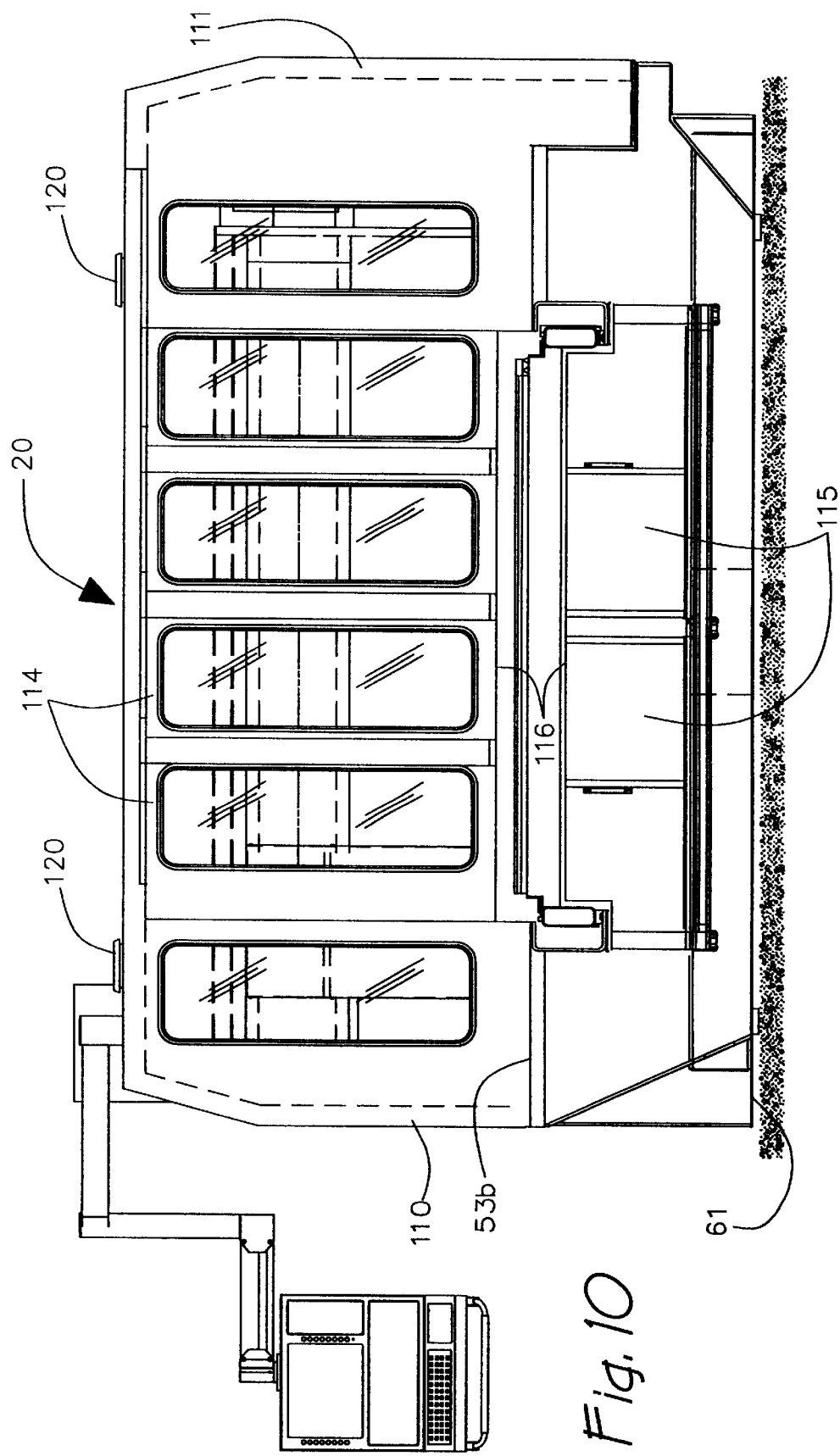
FIG. 10 is an end elevation of the machine tool of FIG. 1.

The pattern of air flow will be best appreciated with reference to FIGS. 3, 7 and 10. The main air flow enters from the slot 116 at the loading end of the machine. Thus the main air flow enters at about the level of the workpiece and is drawn below the workpiece by the suction through the ports leading to the collection ducts 82, 83. In order to prevent the accumulation of fumes in the upper portion of the enclosure above the workpiece, the circulating air flow through the vents 120 flows down past the edges of the workpiece, and in some cases through cutouts in the middle of the workpiece, to also enter the exhaust system. A certain amount of mixing is also achieved by virtue of the traverse of the bridge and the cutting head across the machine as parts are cut. The blower in the dust collection system is set so that the air velocity in the collection zone is high enough to remove the fumes but low enough so that the particulates settle out onto the slag bed rather than being pulled into the vacuum system. This tends to reduce the demands on air handling volume, and also importantly prevents the duct work from clogging with particles which might fall out of the air stream in particular locations. The dust is intended to be left for clean up with the slag, with the air handling system primarily withdrawing the fumes and the smaller particles carried along with them.

Air flow into the collection ducts 82, 83 is substantially uniform, and continues in the ducts 82, 83, thereof to the central portion of the duct where it descends through the apertures 90, 91 into the main duct 70 in the sub-base. Depending on the location of the exhaust equipment, the air flow will then be through the main duct to the external blower and extraction equipment.

In view of the foregoing, it will now be appreciated that what has been provided is an improved air handling system for a laser-equipped machine tool. The system has the main duct work elements built into the base such that it is not at risk of being damaged by a high power laser beam. The main duct, positioned in the sub-base, has plural exits for connection of the extraction equipment. Any of the plural connection points can be selected. The collection ducts span the length of the cutting area and have a plurality of ports facing the cutting zone. The ports are of graduated size so that the air flow into the collection duct is tailored. Cooperating with the extraction portion of the air handling equipment, the machine is enclosed and air inlets through associated vents are provided to control both the direction and quantity of air which enters the machine to tailor it to the requirements of efficient fume extraction.

What is claimed is:

1. A laser-equipped machine tool comprising in combination:
   a machine base supporting a worktable adapted to hold a workpiece;
   the machine base also supporting a cutting head carrying a laser focusing assembly and mounted for traverse over the worktable to cut the workpiece, the traverse having length and width limits defining a cutting zone;
   a trough in the machine bed underlying the worktable and having a trough bottom flanked by upstanding legs and separated from the worktable by a gap;
   each leg having an internal collection duct spanning the cutting zone, ports communicating between the cutting zone and the collection ducts along the length of each said collection duct;
   a main duct in the machine base for connection to a vacuum source and also to the collection ducts so that operation of the vacuum source extracts contaminated air from the cutting zone; and
   vents for controlling the direction and flow of inlet air to the cutting zone.

2. The combination of claim 1 in which the ports in the collection duct comprise a graduated set ranging from small area ports nearest the connection to the main duct, and large area ports farthest from said connection to the main duct.

3. The combination of claim 2 wherein each leg has a plurality of apertures formed therein for defining the locations of the ports, and further including a removable plate containing the ports and attachable to the legs, with the ports registered over the apertures.

4. The combination of claim 1 in which the bottom of the trough is configured for collecting slag resulting from cutting, and wherein the ports are disposed near the slag collection surface.

5. The combination of claim 4 in which the ports are formed in the legs, are positioned outside of the cutting zone for protection from the laser.

6. The combination of claim 1 wherein the ports and the collection duct are located outside the cutting zone for protection from the laser.

7. The combination of claim 1 in which the main duct is T-shaped in configuration, providing outlets on at least three sides of the machine base, to serve as alternative connection locations for the vacuum source.

8. The combination of claim 7 wherein the machine base is a fabricated box structure in which a plurality of boxes within the box structure are closed for stability and arranged to form a four-walled T-shaped duct structure to serve as the main duct.

9. The combination of claim 1 in which the machine tool includes an enclosure having a plurality of vents formed therein for limiting the amount and direction of air flow into the cutting zone.

10. The combination of claim 9 wherein a workpiece loading station is provided at one end of the machine tool, a door structure is provided for enclosing the said one end during cutting, and the door structure provides one of said vents for intake of air during cutting, the last mentioned vent being positioned at about the same height as the workpiece.

11. A laser-equipped machine tool comprising in combination:
   a machine base supporting a worktable adapted to hold a workpiece, the traverse of the cutting head over the workpiece defining a cutting zone in which fumes are produced;

a trough in the machine bed having a slag collection surface underlying the worktable and a pair of upstanding legs separated by the slag collection surface;

collection ducts in each leg having ports communicating with the cutting zone at about the level of the slag collection surface;

a main duct formed in the base, having inlets connected to the collection ducts and having outlets on at least three of the four sides of the machine base; and a vacuum source adapted to be selectively connectable to any of the outlets of the main duct, and covers covering the outlets to which the vacuum source is not connected.

12. The combination of claim 11 wherein the machine base is a box structure fabricated from a plurality of longitudinal, lateral and vertical plates defining an interlocking box structure, the ends of selected ones of the boxes being open in end-to-end fashion to create a continuous enclosed duct to serve as said main duct.

13. The combination as set forth in claim 12 further including electrical terminals at each outlet plate adapted to facilitate connection of electrical power to the selectable one of the outlets to which the vacuum source is connected.

14. The combination of claim 11 further including an enclosure for enclosing the cutting zone.

15. The combination of claim 14 further including vents in the enclosure being sized and positioned to control the direction and quantity of flow into the enclosure for extraction by the vacuum source.

16. A laser-equipped machine tool comprising in combination:

a machine base supporting a worktable adapted to hold a workpiece, traverse of the cutting head over the workpiece defining a cutting zone in which fumes are produced;

a trough in the machine bed having a slag collection surface underlying the worktable and a pair of upstanding legs separated by the slag collection surface;

collection ducts in each leg having ports communicating with the cutting zone at about the level of the slag collection surface;

each leg having an internal collection duct spanning the cutting zone;

a main duct in the machine base connected to the collection ducts and having an outlet for connection to a vacuum source;

each leg having a pattern of ports positioned at about the level of the slag collection surface and communicating with the collection ducts, the ports being graduated in size to configure the flow of fumes from the cutting zone; and a controllably vented enclosure for controlling the direction and quantity of air flow into the cutting zone.

17. The combination of claim 16 wherein the ports are configured by locating the smallest ports nearest the connection to the main duct and the largest ports farthest from said connection so as to render substantially uniform the flow of fumes from the cutting zone.

18. The combination of claim 16 wherein each leg has a plurality of apertures formed therein for defining the locations of the ports, and further including a removable plate containing the ports and attachable to the legs with the ports registered with the apertures.

19. The combination of claim 16 in which the main duct is T-shaped in configuration, providing outlets on at least three sides of the machine base to serve as alternative connection locations for the vacuum source.

20. The combination of claim 19 wherein the machine base is a fabricated box structure in which a plurality of boxes within the base are closed for stability and arranged to form a four-walled T-shaped duct structure to serve as the main duct.

21. The combination of claim 16 wherein the collection ducts and ports are outside the cutting zone for protection from the laser, and the slag collection surface is a laser shield interposed between the cutting head and the main duct.

* * * * *